March 6, 1934.  P. E. KLOPSTEG  1,949,721
BALANCE
Filed Oct. 22, 1929
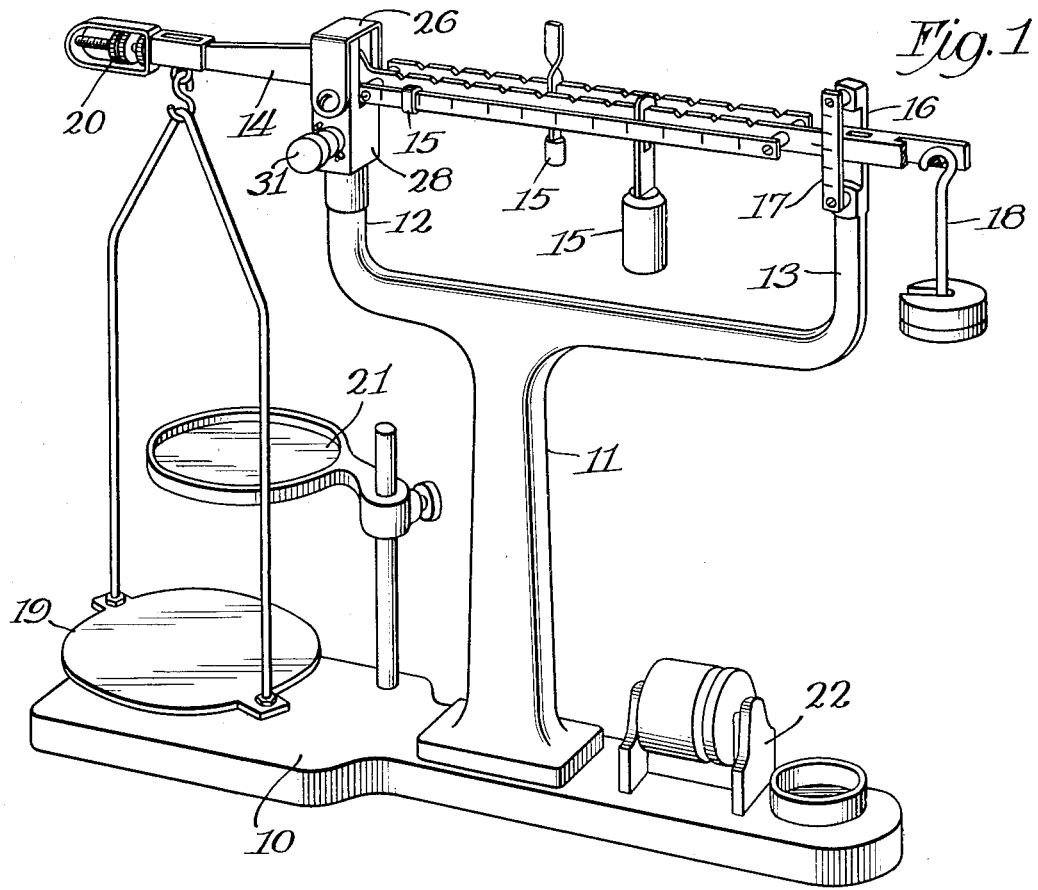
Fig.1
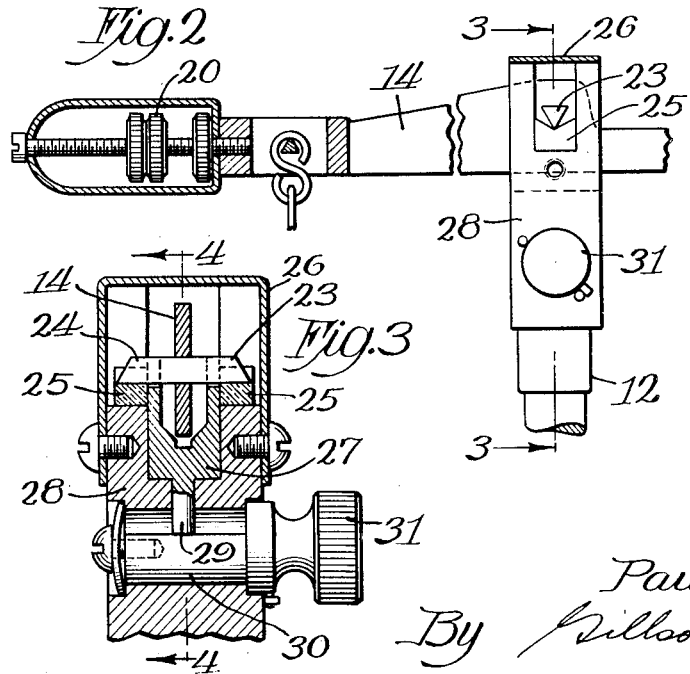
Fig.2
Fig.3
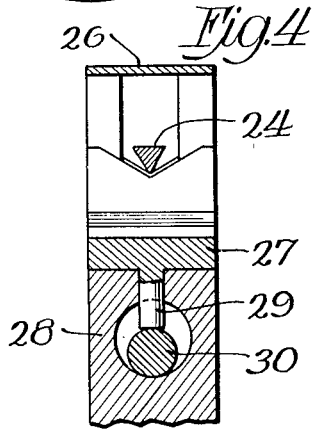
Fig.4
Inventor
Paul E. Klopsteg
By
Attys.

Patented Mar. 6, 1934

1,949,721

UNITED STATES PATENT OFFICE 1,949,721

BALANCE

Paul E. Klopsteg, Chicago, Ill., assignor to Central Scientific Company, Chicago, Ill., a corporation of Illinois Application October 22, 1929, Serial No. 401,602

3 Claims. (Cl. 265—49)

The invention relates to balances especially adapted for laboratory use, its objects being to provide improved means for maintaining the beam in true position with reference to its support and for increasing the capacity of devices of this character.

The preferred embodiment of the invention is hereby described and is illustrated in the accompanying drawing in which Fig. 1 is a view of the device in perspective;

Fig. 2 is a detail side elevation, partly in section, of the beam and its support;

Fig. 3 is a detail section on the line 3—3 of Fig. 2; and

Fig. 4 is a detail section on the line 4—4 of Fig. 3.

The improved scale is provided with a base plate 10 from which rises a suitable standard 11 preferably having a pair of upstanding arms 12, 13, one of which supports the beam 14, the other serving as a guide for the free end thereof. The beam is of the three bar type, each bar carrying a permanently mounted adjustable weight as 15. The free end of the center bar of the beam projects between a pair of guide plates 16, 17 rising from the arm 13, one of these plates being scaled to indicate the degree of deflection of the beam from the horizontal. The weight carrier 18 is suspended from the projecting end of this bar thereby greatly increasing the capacity of the balance. A pan 19 for supporting the object to be weighed is suspended from the rear end of the beam as usual, and there is also present at this end of the beam an adjusting nut 20 of usual form. At 21, there is shown an ordinary beaker platform and at 22 a support for a supply of weights.

The trunnions 23, 24 of the beam 14 are of the knife edge type and the trunnion bearings 25 carried by the arm 12 are V-shaped as plainly shown in Fig. 2 and are secured in place and measurably protected from dust by a sheet metal cap 26.

As is usual in devices of this kind, provision is made for arresting the beam, that is to say for raising it to disengage its trunnions from their bearings. For this purpose, there is provided in the present instance a lifter block 27, vertically slidable within a pocket in a head block 28 mounted on the arm 12, the block 27 having a depending stem 29 which rests upon a shaft 30 eccentrically mounted through the block 28 and controlled by means of a knurled nut 31.

The upper end of the block 27 is recessed to receive the beam 14, the bottom of the recess being V-shaped for the purpose of bringing the beam to a central position should any lateral displacement have occurred.

Normally, the block 27 is out of engagement with the beam, but as raised, the inclined faces of its recess bring the beam to central position if any lateral displacement has occurred. The lifting movement is sufficient to firmly clamp the beam against the top of the cap. As the beam is lowered, its trunnions are guided to central position by the inclined faces of the bearing blocks.

The details of the arresting and centering means may be variously changed within the scope of the invention.

I claim as my invention:

1. In a balance of the class described, a scale beam having knife edge trunnions, bearings on opposite sides of the beam cooperating with the trunnions to support the beam, means for lifting the beam from the bearings when the scale is not in use to protect the bearings from possible damage, said means including a centering device adapted to position the beam centrally with respect to the bearings so that when the beam is lowered it will always occupy a central position between the bearings.

2. In a balance of the class described, a scale beam having knife edge trunnions, bearings on opposite sides of the beam cooperating with the trunnions to support the beam, means for lifting the beam from the bearings when the scale is not in use to protect the bearings from possible damage, said means including a V-shaped arrester adapted to directly engage the beam and position it centrally with respect to the bearings so that when the beam is lowered it will always occupy a central position between the bearings.

3. In a balance of the class described, a scale beam having a rigidly attached knife edge pivot, a V-shaped bearing adapted to receive the pivot and support the beam, an arrester for raising the beam from the bearing to protect the knife edge pivot from possible damage, means for transversely centering the beam with respect to the bearing while the beam is raised, said V-shaped bearing and means cooperating to bring the scale beam pivot at precisely the same position on the bearing when the beam is successively lowered from its raised position.

PAUL E. KLOPSTEG.